United States Patent Office 2,753,323
Patented July 3, 1956

---

2,753,323

EPOXY RESINS CURED WITH AN AMINE HAVING AT LEAST ONE CYANOETHYL GROUP

Alford G. Farnham, Caldwell, N. J., assignor to Union Carbide and Carbon Corporation, a corporation of New York No Drawing. Application March 30, 1953, Serial No. 345,673

18 Claims. (Cl. 260—47)

This invention relates to novel compositions of matter which can be hardened to valuable materials and are useful in the manufacture of varnishes, enamels, molding compositions, adhesives, films, etc. The compositions of this invention comprise a glycidyl polyether in combination with a compound having the formula:

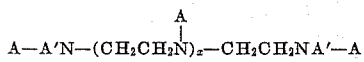

wherein $x$ represents an integer in the range 0 through 3 and A and A' represent a member selected from the group consisting of hydrogen and cyanoethyl radicals, and further characterized in that the amine has at least one cyanoethyl group and at least one non-tertiary amino group in the molecule. The use of cyano-substituted amine hardening agents with the epoxy resins provides compositions suitable for casting the material into large sections superior to those heretofore obtainable.

The glycidyl ethers suitable for use in the practice of my invention include the 1,2-epoxy containing polyethers of polyhydric alcohols such as the polyglycidyl ethers thereof, such as, for example, the diglycidyl ethers of ethylene glycol, propylene glycol, trimethylene glycol, butylene glycol, diethylene glycol, triethylene glycol, glycerol dipropylene glycol, and the like.

The glycidyl ethers particularly suitable for use in this invention comprise the glycidyl polyethers of polyhydric phenols. The glycidyl ethers of dihydric phenols employed in the compositions of my invention are readily obtained by reacting, at a slightly elevated temperature in the range 50° C.–150° C., in excess of one mol of epichlorhydrin with a mol of a suitable dihydric phenol in the presence of a base, such as an alkali or alkaline earth metal hydroxide. Although the product is a complex mixture of glycidyl ethers, the principal product may be represented by the formula:

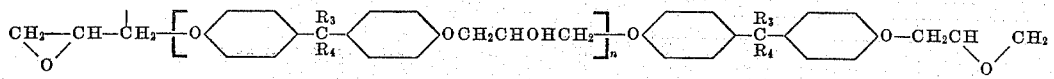

wherein $R_3$ and $R_4$ represent hydrogen, alkyl or aryl radicals and $n$ represents 0,1,2,3, etc. The length of the chain can be made to vary by changing the molecular proportion of epichlorhydrin to dihydric phenol. Thus, by decreasing the mols of epichlorhydrin per mol of dihydric phenol the molecular weight and the softening point of the glycidyl ether may be increased.

Any of the various dihydric phenols may be used in the preparation of the polyethers and the dihydric phenols include, for example, mononuclear phenols and polynuclear phenols of the nature of 2,2-bis-(4-hydroxyphenyl) - propane, bis(4 - hydroxyphenyl)methane, 1,1 - bis(4 - hydroxyphenyl) ethane, 1,1 - bis(4 - hydroxyphenyl)isobutane, 2,2 - bis(4 - hydroxyphenyl) butane, 2,2 - bis(4 - hydroxy - 2 - methylphenyl)propane, 2,2 - bis(4 - hydroxy - 2 - tertiarybutylphenyl)propane and 2,2-bis(2-hydroxynaphthyl)pentane, etc.

Heretofore, amines, such as, for example, diethylene triamine have been known and used as curing or hardening agents for epoxy resins. One of the most serious problems in the application of the epoxy type resins to industrial purposes is the problem of prolonged "pot life" after the curing or hardening agent has been added to the epoxy resin just prior to use. The term "pot life" is the term that has been used in the art to express the amount of time between the time the hardening agent has been added to the epoxy resin and the time when the composition of resin and hardener is no longer suitable for use. It is essential that the composition retain a workable fluid consistency for a sufficient period of time to permit application of the composition for the desired purpose. Therefore, it is an object of this invention to provide compositions of epoxy resins and a hardening agent which gives a "pot life" greater than is now possible in the art.

Another serious drawback accompanying the use of the prior art hardening agents is that when a typical prior art hardener, such as diethylene triamine, is used the rate of reaction is faster than is normally desirable and therefore does not permit use of the composition where a slower rate of hardening is desirable, for example in curing a large mass of material. Therefore, it is an object of this invention to provide a hardener for epoxy resins which will not harden at an extremely undesirable rate.

I have discovered that when acrylonitrile is reacted with an amine or polyamine that there is produced a hardening agent free from the objectionable qualities attributed to the prior art hardeners. These new type hardeners when added to an epoxy resin provide for greater fluidity and a longer "pot life" of the composition.

The hardening agents of my invention comprise the adducts of an aliphatic nitrile and a polyamine. More particularly, the hardeners are the products of the reaction between acrylonitrile and a suitable polyamine. The nitriles employed in the preparation of the hardeners may be any unsaturated aliphatic nitrile. Suitable nitriles include, for example, acrylonitrile, methacrylonitrile, crotonic nitriles, fumaric and maleic dinitriles, and the like. Suitable amines employed in the preparation of the hardeners may be of any type desired. Preferred amines include, for example, diethylene triamine, ethylene diamine, triethylene tetramine, tetraethylene pentamine. A preferred embodiment of hardening agent comprises the adduct of from 1 to 3 mols of acrylonitrile and one mol of diethylene triamine. The principal requirement of the amine is that it have an available hydrogen atom capable of reacting with acrylonitrile. Therefore, tertiary amines are excluded from this invention as starting materials for the preparation of the hardening agent.

The reaction whereby the hardening agents are formed may be illustrated by the following equation:

(I)

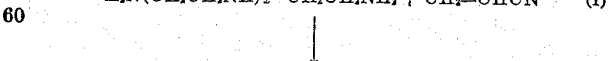

(II)

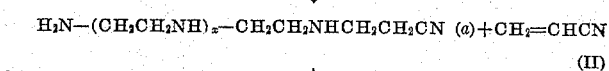

wherein $x$ represents an integer in the range 0 through 3.

It is obvious that mixtures of the primary, secondary and tertiary amines will be produced when acrylonitrile is reacted with polyfunctional amines. Mainly, though, the primary amino groups will be more reactive and react preferentially with acrylonitrile.

The compounds (a) and (b) of the Equations I and II above, or mixtures of the above, are suitable hardeners. Compound (b) imparts greater fluidity to the hardener-resin composition than compound (a), but both of the compounds are far superior to the hardeners heretofore known in the prior art. Both of the compositions employing compounds (a) and (b) above yield hardener-resin compositions of longer "pot life," better consistency for pouring, greater initial fluidity, and the hardened compositions have greater impact strength than compositions hardened by the use of recognized prior art hardeners. These new amine type hardeners are considerably less affected by atmospheric moisture and carbon dioxide. They are also less toxic than the amines from which they are prepared. Furthermore, the hardeners are readily miscible and soluble in the epoxy resin.

A preferred specie of my invention comprises a composition of matter comprising a glycidyl polyether of 2,2-bis(4-hydroxyphenyl)propane in combination with a compound having the formula:

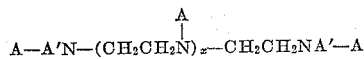

wherein $x$ represent an integer in the range 0 through 3 and A and A' represent a member selected from the group consisting of hydrogen and cyanoethyl radicals, and further characterized in that the amine has at least one cyanoethyl group and at least one non-tertiary amino group in the molecule. The use of cyano-substituted hydrocarbon amine hardening agents with the epoxy resins provides compositions suitable for casting the material into large sections far superior to those heretofore obtainable.

In the following Table I have made a comparison of the hardeners of this invention and a typical prior art hardener (diethylenetriamine) with a typical epoxy resin prepared from 2,2-bis(4-hydroxyphenyl)propane and epichlorhydrin.

TABLE I

| Hardener | Reaction product of 1 mol acrylonitrile, 1 mol diethylenetriamine | Reaction product of 1.5 mols acrylonitrile, 1 mol diethylenetriamine | Reaction product of 2 mols acrylonitrile, 1 mol diethylenetriamine | Diethylene Triamine |
| --- | --- | --- | --- | --- |
| Ratio of Hardener to Resin (epoxy equiv./amino hydrogen equiv.) | 1.1:1 | 1.1:1 | 1.1:1 | 1:1. |
| Viscosity (Centistokes at 25° C.) of Resin-Hardener composition after mixing 5 minutes | 1,500 | 1,400 | 1,300 | 1,680. |
| Pot Life (time to gel for a 50 gram mix at room temperature) | 65 min | 2¾ hrs | 8 hrs | 28 min. |
| Flexural Strength (p. s. i.) | 18,800 | 15,400 | 15,200 | 20,000. |
| Modulus of Elasticity (p. s. i.) | 0.50×10⁶ | 0.48×10⁶ | 0.50×10⁶ | 0.45×10⁶. |
| Work to break (ft. lb./in.³) | 10.6 | 12.8 | 6.0 | 7.9. |
| Izod Impact | 0.89 | 1.05 | 1.12 | 0.84. |

The conclusions to be arrived at from Table I indicate that hardeners of my invention give increased fluidity to the compositions of hardener and resin and increased "pot life" and an increased impact strength of the final hardened compositions. The increased impact strength indicates that the initial fluidity of the resin-hardener compositions has no undesirable effect on the final strength of the composition. Therefore, the amount of hardener necessary to yield the desired result is not a critical feature of the invention.

The following examples will serve to illustrate the specific preparation of the acrylonitrile-polyamine adducts. If desired, the acrylonitrile-polyamine adducts may be prepared according to method described in U. S. Patent 1,992,615 of February 26, 1935.

EXAMPLE I

Acrylonitrile was slowly added with agitation to diethylene triamine in a mol ratio of 1:1 while the temperature was maintained in the range of 40° C.–50° C. The reaction was allowed to continue for about 15 minutes after all the acrylonitrile had been added, the product was violet colored and had a slight ammonical odor. Upon heating to temperatures in excess of 100° C. the product became amber in color.

EXAMPLE II

Acrylonitrile was added slowly with agitation to diethylene triamine in the mol ratio of 2:1, over a two hour period with cooling at 10° C.–15° C. The product was violet colored, which changed to amber when heated to temperatures in excess of 100° C. and had a slight ammoniacal odor. Approximately 40 grams of the product were distilled under a reduced pressure of 0.4 mm. Hg and yielded 31.4 grams of colorless distillate, which had a boiling point in the range 150° C.–200° C. and a residue of 7.2 grams. Both the residue and distillate were soluble in water and little, if any, decomposition was indicated.

EXAMPLE III

Acrylonitrile was added to diethylene triamine in the ratio of 3:2 under the same conditions as set forth in Example II. The product was blue in color, which changed to an amber color when heated to temperatures in excess of 100° C.

EXAMPLE IV

One mole of tetraethylene pentamine was heated to 60° C. and two mols of acrylonitrile were added dropwise while maintaining the temperature between 58° C.–63° C. After all of the acrylonitrile was added the temperature was maintained at 62° C.–65° C. for an additional hour, then the temperature was raised to a temperature in the range 100° C.–110° C. for another hour. The reaction fixture was cooled. The resulting product was an amber colored liquid.

The following examples will serve to illustrate a method for the preparation of typical glycidyl polyethers previously discussed:

EXAMPLE V

A polyphenylolmethane mixture was made by reacting 590 grams (6 mols) of phenol at 30° C.–35° C. with 81 grams of 37% formalin (1 mol of HCHO) in the presence of sufficient concentrated hydrochloric acid to reduce the pH of the mixture below zero until all of the formaldehyde had reacted. Excess phenol was distilled off under 50 mm. of mercury pressure at below 165° C. The residue of about 180 grams consisted of approximately two-thirds by weight of a mixture of isomeric diphenylolmethanes and about one-third of higher molecular analogous structures containing three and four phenyl rings.

The aforesaid distillation residue of mixed polyphenylolmethanes (about 180 grams) was reacted with 550 grams (6 mols) of epichlorhydrin and 180 grams of a 50% aqueous solution of caustic soda at 50° C.–60° C. during about 2 hours. Excess epichlorhydrin then was distilled off under vacuum at temperatures below 60° C., the mixed polyepoxypropyl ethers of polyphenylolmethanes separated as a viscous liquid having an equivalent weight of 171 grams per epoxy group. This product comprised about two-thirds by weight of diepoxypropyl ethers of mixed diphenylolmethanes (mostly 2,4'- and 4,4'-isomers) and about one-third of the triepoxypropyl and polyepoxypropyl ethers of mixed polyphenylolmethanes containing three or more benzene nuclei, all phenolic groups being reacted to form epoxypropyl groups.

In a like manner the glycidyl ether of 2,2-bis(4-hydroxyphenyl)propane may be produced.

Also, in the manner described above the glycidyl ethers of glycerol and diethylene glycol may be produced readily.

The compositions of the glycidyl polyether and the acrylonitrile-polyamine hardening agent may be prepared in the following manner:

EXAMPLE VI

The glycidyl ether of glycerol was added to the cyanoethylated amine, which was produced by the reaction of two mols of acrylonitrile and one mol of diethylene triamine, in the ratio of 17.1 grams of the glycidyl ether of glycerol to 6.97 grams of the cyanoethylated amine. The equivalent weight of the glycidyl ether was 171 grams per epoxy group. The proportions shown above correspond to a ratio of epoxide equivalent to amino hydrogen equivalent of 0.1 to 0.1.

The composition was mixed well for five minutes and let stand for a period of thirty minutes under vacuum to free the composition of bubbles. The composition was then cast into molds that had been prewarmed to 60° C. The filled molds were held at a temperature of 60° C. for a period of three-quarters of an hour. The temperature was then elevated to 80° C. for a period of one hour to allow the resin to gel. A further heating period of three hours at 100° C. followed the gelling period. The molded compositions were then removed from the molds and annealed at 110° C. for one hour.

EXAMPLE VII

The glycidyl ether of diethylene glycol was added to the cyanoethylated amine, which was produced by the reaction of two mols of acrylonitrile to one mol of diethylene triamine, in the ratio of 9.7 grams of diethylene glycol glycidyl ether to 3.5 grams of the cyanoethylated amine. The equivalent weight of the glycidyl ether was 193.5 grams per epoxy group. The proportions of glycidyl ether and cyanoethylated amine shown above correspond to a ratio of epoxide equivalent to amino hydrogen equivalent of 0.05 to 0.05.

The composition was mixed and cured in accordance with the procedure outlined in Example VI above.

EXAMPLE VIII

The glycidyl ether 2,2-bis(4-hydroxyphenyl)propane having the following structural formula:

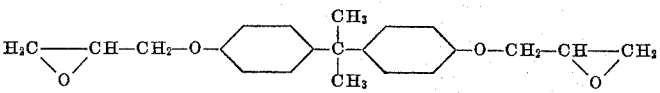

and having the following specifications:

Viscosity at 25° C.=9,000–17,000 centistokes
Epoxy value=185–200 grams/gram mol epoxy
Hydrolyzable chlorine =0.27% maximum
Gardener color=10 max.
Specific gravity=1.15–1.16 was mixed with the cyanoethylated amine, which was produced by the reaction of two mols of acrylonitrile and one mol of diethylene triamine. The composition was worked up in the manner outlined in Example VI above.

The following table summarizes the physical properties of the hardened resins when combined in various proportions of resin and hardener:

TABLE II

*Physical properties of diglycidyl ether of 2,2-bis(4-hydroxyphenyl)propane cyanoethylated amine combinations*

| Proportions (by weight): | | | |
|---|---|---|---|
| Epoxy resin | 2 | 8 | 3 |
| Cyanoethylated amine | 1 | 3 | 1 |
| Epoxy/amino hydrogen ratio | 1.0/1.3 | 1.0/1.0 | 1.0/0.8 |
| Viscosity of mix at 25° C. (cst.) | 1,150 | 1,500 | 1,660 |
| Pot Life (1 lb. left at room temp. 32° C.) min | 90 | 103 | 125 |
| Physical Properties on Cured Resin: | | | |
| Tensile (p. s. i.) | 7,330 | 9,660 | 10,630 |
| Compressive (p. s. i.) | 8,680 | 13,300 | 14,200 |
| Flexural ½″ x ¼″ Edgewise 4″ Span (p. s. i.) | 13,700 | 18,200 | 18,800 |
| Flexural Modulus of Elasticity (p. s. i.) | 0.34×10⁶ | 0.45×10⁶ | 0.47×10⁶ |
| Flexural Work to Break (ft. lb.): ½″ x ¼″ x 4″ Span | 2.33 | 2.58 | 2.56 |
| Flexural Notch Sensitivity | 1.59 | 1.33 | 1.65 |
| Izod Impact, ft. lb./in. notch 77° F | 1.02 | 1.15 | 1.07 |
| Rockwell Hardness | M20 | M68 | M70 |
| Heat Distortion C° | 69 | 56 | 56 |
| Electrical Properties on Cured Resin: | | | |
| D. C. Resistivity at 25° C. (Megohm cms.) | 3.7×10⁷ | 2.5×10⁸ | 3.5×10⁸ |
| Dielectric Strength (volts/mil) (step by step) | 563 | 584 | 574 |
| Arc Resistance (sec.) | 95 | 76 | 75 |
| Power Factor, 60 cycles | 0.031 | 0.019 | 0.016 |
| Power Factor, 10³ cycles | 0.029 | 0.024 | 0.021 |
| Power Factor, 10⁶ cycles | 0.068 | 0.055 | 0.051 |
| Dielectric Constant, 60 cycles | 5.89 | 5.16 | 4.99 |
| Dielectric Constant, 10³ cycles | 5.58 | 4.99 | 4.83 |
| Dielectric Constant, 10⁶ cycles | 4.40 | 4.04 | 4.02 |
| Loss Factor, 60 cycles | 0.182 | 0.098 | 0.079 |
| Loss Factor, 10³ cycles | 0.164 | 0.122 | 0.102 |
| Loss Factor, 10⁶ cycles | 0.304 | 0.221 | 0.204 |

What is claimed is:

1. A composition of matter comprising a glycidyl polyether in combination with a compound having the formula:

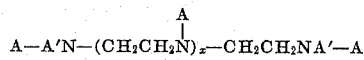

wherein $x$ represents an integer in the range 0 through 3 and A and A' represent a member selected from the group consisting of hydrogen and cyanoethyl radicals, and further characterized in that the amine has at least one cyanoethyl group and at least one non-tertiary amino group in the molecule.

2. A composition according to claim 1 further characterized in that the glycidyl polyether is a glycidyl polyether of a dihydric phenol.

3. A composition according to claim 1 further characterized in that the glycidyl polyether is the diglycidyl ether of 2,2-bis(4-hydroxyphenyl)propane.

4. A composition of matter comprising a glycidyl polyether in admixture with a polyalkylene polyamine having at least one cyano-substituted hydrocarbon group and at least one non-tertiary amino group.

5. A composition of matter comprising a glycidyl polyether in admixture with a compound having the formula:

wherein $x$ represents an integer in the range 0 through 3.

6. A composition of matter comprising a glycidyl polyether in admixture with a compound having the formula:

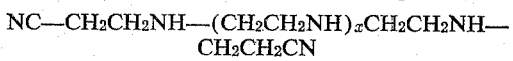

wherein $x$ represents an integer in the range 0 through 3.

7. A composition according to claim 5 wherein the glycidyl polyether is a glycidyl polyether of a dihydric phenol.

8. A composition according to claim 5 wherein the glycidyl polyether is a glycidyl polyether of 2,2-bis(4-hydroxyphenyl)propane.

9. A composition according to claim 6 wherein the glycidyl polyether is a glycidyl polyether of a dihydric phenol.

10. A composition according to claim 6 wherein the glycidyl polyether is a glycidyl polyether of 2,2-bis(4-hydroxyphenyl)propane.

11. A composition of matter comprising a glycidyl polyether in combination with a cyanoethylated amine produced by the reaction of two mols of acrylonitrile and one mol of diethylene triamine.

12. A composition of matter comprising a glycidyl polyether in combination with a cyanoethylated amine produced by the reaction of from 1 to 3 mols of acrylonitrile and one mol of diethylene triamine.

13. A composition according to claim 11 wherein the glycidyl polyether is the glycidyl polyether of a dihydric phenol.

14. A composition according to claim 11 wherein the glycidyl polyether is the glycidyl polyether of 2,2-bis(4-hydroxyphenyl)propane.

15. A composition according to claim 11 wherein the glycidyl polyether is the glycidyl polyether of glycerol.

16. The method of producing a hardened epoxy resin which comprises adding to a 1,2-epoxy resin a hardener that is the product of the reaction of from 1 to 3 mols of acrylonitrile per mol of diethylene triamine.

17. The method of producing a hardened epoxy resin which comprises adding to a 1,2-epoxy resin a hardener that is the reaction product of two mols of acrylonitrile and one mol of diethylene triamine.

18. The method of producing a hardened composition of the diglycidyl ether of 2,2-bis(4-hydroxyphenyl)propane, which comprises adding to said glycidyl ether a hardener that is the product of the reaction of two mols of acrylonitrile and one mol of diethylene triamine.

References Cited in the file of this patent

UNITED STATES PATENTS

| | | |
|---|---|---|
| 2,528,933 | Wiles | Nov. 7, 1950 |
| 2,637,715 | Ott | May 5, 1953 |

FOREIGN PATENTS

| | | |
|---|---|---|
| 133,819 | Australia | Aug. 10, 1949 |
| 630,663 | Great Britain | Oct. 18, 1949 |